US005592170A

United States Patent [19]

Price et al.

[11] Patent Number: 5,592,170
[45] Date of Patent: Jan. 7, 1997

[54] RADAR SYSTEM AND METHOD FOR DETECTING AND DISCRIMINATING TARGETS FROM A SAFE DISTANCE

[75] Inventors: Robert H. Price, Santa Fe; Herbert T. Davis, III, Corrales; Scott A. Dunn, Alburquerque, all of N.M.

[73] Assignee: Jaycor, San Diego, Calif.

[21] Appl. No.: 466,938

[22] Filed: Jun. 6, 1995

Related U.S. Application Data

[63] Continuation-in-part of Ser. No. 421,692, Apr. 11, 1995, abandoned.

[51] Int. Cl.$^6$ .............................. G01S 13/24; G01S 7/41
[52] U.S. Cl. .............................................................. 342/22
[58] Field of Search .............................. 342/22, 90, 133, 342/146, 27, 129, 130, 131, 132, 200, 201, 202, 203

[56] References Cited

U.S. PATENT DOCUMENTS

| | | | |
|---|---|---|---|
| 4,381,544 | 4/1983 | Stamm | 364/420 |
| 4,430,653 | 2/1984 | Coon et al. | 342/22 |
| 4,691,204 | 9/1987 | Hiramoto | 342/22 |
| 4,698,634 | 10/1987 | Alongi et al. | 342/22 |
| 4,967,199 | 10/1990 | Gunton et al. | 342/22 |
| 5,057,846 | 10/1991 | Harmoth | 342/22 |
| 5,248,975 | 9/1993 | Schutz | 342/22 |
| 5,357,253 | 10/1994 | VanEtten et al. | 342/22 |
| 5,361,072 | 11/1994 | Barrick et al. | 342/133 |

OTHER PUBLICATIONS

Iizuka, et al., "Detection of Nonmetallic Buried Objects by a Step Frequency Radar", *IEEE*, 71:2 pp. 276–279 (Feb. 1983).

Skolnik, "Fifty Years of Radar", *Proceedings of the IEEE*, 73:2, pp. 182–197 (Feb. 1985).

"Sensor Technology Assessment for Ordnance and Explosive Waste Detection and Location", *Jet Propulsion Laboratory Publication No. JPL D–11367, Revision B*, pp. 50–51 and 75–76 (Mar. 1, 1995).

*Primary Examiner*—Daniel T. Pihulic
*Attorney, Agent, or Firm*—Fitch, Even, Tabin & Flannery

[57] ABSTRACT

A frequency-agile, narrow-instantaneous bandwidth radar system detects objects, and discriminates between different types of objects, from a safe stand-off distance. Transmit circuitry transmits a train of continuous wave signals in a multitude of stepped operating frequencies that illuminates the target area. Return signals from the target area are received through at least a pair of spaced-apart receive antennas. Signal receive/processing circuitry coupled to the spaced-apart receive antennas selectively combines and processes the return signals to identify variations in the received signals indicative of the presence of a specific type of object. At each of the stepped frequencies, the system noise and the clutter of the signals is reduced by averaging and smoothing the incoming data and the cross-power spectrum at each frequency is calculated. Using the information of the power spectra of all frequencies, the Mahalanobis distance is defined and the presence and classification of a target is determined. Using the information of the cross-power spectra of all frequencies, the location of the mine is determined by the azimuth angle and echo time.

28 Claims, 8 Drawing Sheets

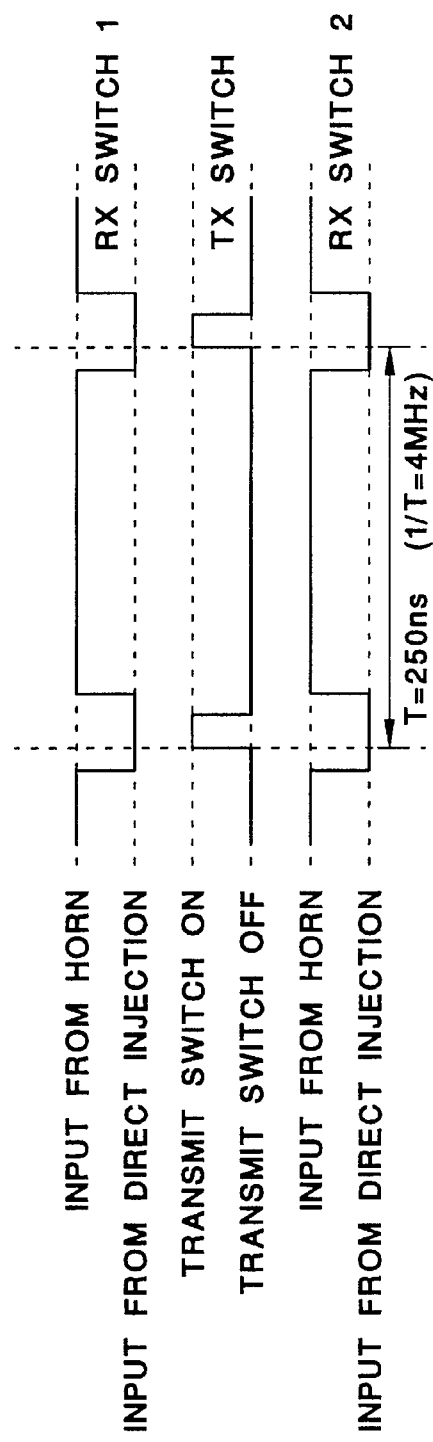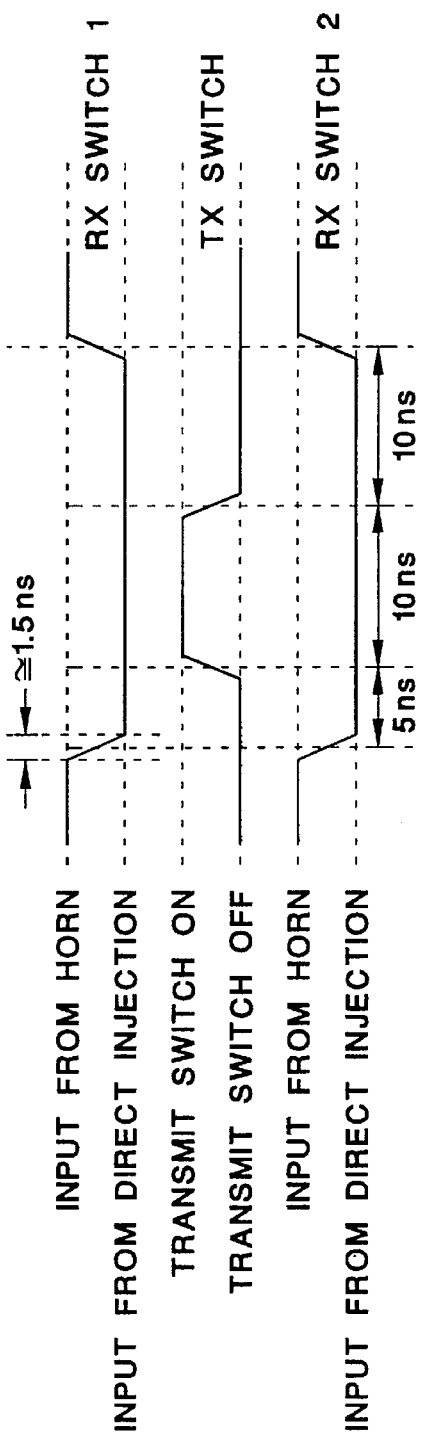

RADAR SYSTEM AND METHOD FOR DETECTING AND DISCRIMINATING TARGETS FROM A SAFE DISTANCE

This is a continuation-in-part of U.S. patent application Ser. No. 08/421,692; filed Apr. 11, 1995, now abandoned.

BACKGROUND OF THE INVENTION

The present invention relates to radar systems and methods, and more particularly to a frequency-agile radar system capable of detecting and identifying a particular type of target from a safe stand-off distance.

The word "radar" is an acronym for "radio detecting and ranging." Most radar systems emit electromagnetic radiation in the radio frequency (RF) range in short bursts or pulses, with a relatively long interval between pulses. Then, the pulses which have been re-radiated (reflected) from objects (targets) are detected. The time delay between the transmitted and received pulses provides a measure of the distance to the target. The bearing to the target is usually determined from a knowledge of the pointing direction of a narrow RF beam produced by the radar antenna.

Early radar systems used radar frequencies having wavelengths of several meters. By the 1940's, microwave frequencies were used, and now there are radars operating at millimeter and optical wavelengths. The advantage of the shorter wavelengths is a narrower beam width for a given overall antenna size. The disadvantages of shorter wavelengths include greater loss of signal strength because of increased atmospheric absorption and scattering plus various equipment limitations.

The civilian and military applications of radar for surveillance, navigation, air-traffic control, weather tracking, early warning, and missile guidance are well known. Perhaps not so well known, but still a viable and valuable application for radar systems, are systems that provide radar imagery. Radar imagery is complementary to photographs obtained with infrared, visible, or ultraviolet waves. Although similar to a photograph, radar imagery highlights different features. For example, radar is sensitive to vertical dimensions and, therefore, it emphasizes topographic features. Since the atmosphere is essentially transparent for microwaves, radar thus permits acquisition of information under "all weather," day or night conditions that are impossible with photographic techniques. For example, radar imagery has permitted several million square kilometers of South America to be mapped, even though the mapped area is usually concealed by heavy cloud cover. Disadvantageously, however, radar imagery systems have yet been able to provide a meaningful discrimination between two similar-sized, yet different, objects that may be illuminated by the probing radar signal. That is, radar imagery systems have not generally been able to successfully discriminate at relatively long ranges (e.g., several kilometers) between, e.g., an automobile and a pile of garbage, or between a microwave dish antenna and a tin roof on a storage shed. What is needed, therefore, is a means for not only detecting and mapping objects with a radar system, but also a means for discriminating between the different types of objects that are detected.

While the atmosphere is essentially transparent for microwaves, the earth is not. Thus, electromagnetic waves are highly attenuated (with the attenuation increasing with an increase in frequency) when propagating through the earth, due to moisture and dense objects. Even so, radar systems that provide ground probing at short ranges (a few meters) have proved useful for a number of civilian applications, such as (1) detection of buried pipes (metallic and nonmetallic) and utility cables; (2) archeological mapping and geophysical prospecting; (3) location of voids or other subsurface conditions under highways and bridges; (4) detection of hidden objects and voids in walls and tunnels; or (5) measurement of ice thickness and location of permafrost. There are also corresponding military applications for a ground-probing radar system, such as the location of mines or explosives that have been hidden underground, in tunnels, or elsewhere.

Typically, a ground-probing radar is portable or mobile, and uses an antenna mounted at or near the ground. It has a high-range resolution capability made possible through the use of an extremely wide bandwidth (e.g., several hundred megahertz). Disadvantageously, such ground-probing systems are only effective at a very short range, e.g., a few meters. For some types of objects, such as a dangerous underground void, or a buried land mine, it is necessary that the object be detected from a safe stand-off distance, e.g., before the void caves in due to the weight of the equipment and operator, or before the land mine detonates. Hence, what is needed is a ground-probing radar system that can successfully detect dangerous hidden conditions or objects from a safe stand-off distance.

Further, even at a relatively short range, e.g., several meters, it is important that a ground-probing radar system be able to successfully discriminate between two similar sized objects, one of which is dangerous and the other of which is benign. Thus, there is a need for a system and method that not only detects hidden objects from a safe stand-off distance, but that also discriminates between a dangerous object, e.g., a buried land mine, and a benign object that has a similar size and shape, e.g., a buried can or a rock, regardless of the orientation of the object relative to the probing signal.

The present invention advantageously addresses the above and other needs.

SUMMARY OF THE INVENTION

In accordance with one aspect of the present invention, a frequency-agile radar system is provided that successfully detects targets, and discriminates between different types of targets, from a safe stand-off distance. The system generates and transmits an incident radar signal that is directed at a target area. Return signals are received through at least a pair of spaced-apart receiving antennas. The return signals received at the receiving antennas are selectively combined and processed so as to remove or suppress background noise included as part of the return signal, and so as to identify variations in the received signals indicative of the presence of a specific type of target.

In accordance with another aspect of the invention, the location of a detected target may also be determined. Such is accomplished by varying the frequency of the incident radar signal using the frequency-agile features of the invention, in combination with selective signal processing. The frequency varying is preferably accomplished by transmitting a train of pulsed continuous wave signals in a multitude of stepped operating frequencies that illuminates the target area. For each of the stepped frequencies, the reflected signals are then collected and processed in the frequency domain to determine the approximate azimuth and range of a target within the target area.

The frequency-agile radar system of the invention includes at least three antennas, a transmitter circuit, and a receiver circuit and a signal processing subsystem. One of the three antennas is for transmitting; and two are for receiving. More antennas may be used as needed or desired. For example, in some embodiments, the same antenna may serve as both a transmitting and receiving antenna, with preferably two transmitting antennas and two receiving antennas being used. Typically, the antennas are mounted on a common support structure that provides a specified separation therebetween, e.g., with the transmitting antenna being positioned in line with the center line between the two receiving antennas. However, it should be noted that separate support structures may also be employed so long as a known antenna separation is maintained. The support structure, including the antennas mounted thereto, as well as the transmitter circuits, receiver circuits, and signal processing subsystem are sufficiently small and light weight, and have sufficiently low power requirements, so as to make the entire frequency-agile radar system readily transportable.

In operation, the transmitter circuit generates a burst of microwave power having a specified waveform, including a selectable frequency, pulse width and/or modulation pattern, and couples such microwave power to the transmitting antenna(s). The microwave power is directed by the transmitting antenna(s) towards the target area. Upon reaching the target area, the incident microwave power interacts with whatever objects (targets) may be located in the target area to create return signals. The return signals typically comprise, e.g., signals reflected from the surface of such objects as a result of the incident microwave power. In some instances, the return signals may include signals generated by the objects as a result of the incident microwave power. The return signals are received at each of the spaced-apart receiving antennas and are appropriately processed.

Advantageously, the frequency-agile radar system of the present invention addresses four key areas that have not successfully been addressed with ground penetrating radar systems of the prior art. First, the ground penetrating radar system is suitable for mounting on a mobile vehicle which thus may be operated at a safe stand-off distance. Second, the ground penetrating radar system successfully distinguishes a small object (such as a land mine) having a relatively large reflectivity from a background having a small reflectivity per unit area but a relatively large area, such as soil or rocks. Third, the ground penetrating radar system accommodates a radar return signal which may vary a great deal due to target orientation. Fourth, the ground penetrating radar system successfully detects and identifies buried targets even though the radar return signal diminishes relative to the background return signal as the burial depth or soil conductivity increases.

One embodiment of the present invention may be characterized as a radar system. Such radar system includes a transmitting station that includes frequency-agile transmitting means for transmitting an incident pulse of microwave power having an adjustable or stepped frequency. Also included as part of the system is at least two receiving stations disposed at spaced apart locations relative to the location of the transmitting station. Each receiving station includes means for receiving a return pulse of the microwave power from a target area illuminated by the incident pulse of microwave power. The return pulse represents the reflection of the incident pulse of microwave power from at least one object located within the target area. The receiving means further includes means for detecting, conditioning, and digitizing the received signals. Further included as part of the radar system is a signal processing subsystem that includes a processing means for processing the digitized signals received at each of the plurality of spaced-apart locations in respective processing channels.

The invention may also be characterized, in accordance with another embodiment thereof, as detection apparatus that detects the presence of an object within a target area from a probing location located a prescribed stand-off distance away from the target area. Such detection apparatus includes irradiating means for irradiating the target area with an incident pulse of microwave power from the probing location. Such microwave pulse has a prescribed waveform. The detection apparatus also includes receiving means for receiving a return pulse signal of microwave power reflected from the target area at two spaced-apart locations. The two spaced-apart locations have a prescribed orientation relative to the probing or irradiating location. Further, the detection apparatus includes processing means for processing the return pulse signal received by the receiving means at the two spaced-apart locations to remove background clutter therefrom, and for statistically determining whether the return pulse signal thus processed indicates the presence of the object.

The present invention may further be viewed as a method of detecting the presence of an object within a target area from a probing location a prescribed stand-off distance away from the target area. Such method includes (a) irradiating the target area with an incident pulse of microwave power from the probing location; (b) receiving a return pulse of microwave power reflected from the target area at two spaced-apart locations, the two spaced-apart locations having a prescribed orientation relative to the probing location; (c) pre-processing the return pulse received at the two spaced-apart locations in step (b) to detect, condition and digitize the received signal; (d) further processing the digitized signal to remove background clutter and noise therefrom; and (e) applying a decision statistic to the digitized signal processed in step (d) to determine the presence of the object, the location of an object, and the classification of an object.

It is thus a feature of the invention to provide a frequency-agile radar system and method that allows detection and discrimination of selected individual targets from relatively short ranges (e.g., 2 to 30 meters or more), as well as the detection of clusters of such individual targets, e.g., a mine field, from relatively long ranges (e.g., several kilometers).

It is another feature of the invention to provide such a frequency-agile radar system and method that provides location resolution of detected targets to within a fraction of a wavelength of the radar signal used (e.g., to within a few centimeters).

It is yet an additional feature of the invention to provide a frequency-agile radar system and method that may be used to detect both metallic and dielectric targets, either buried or on the surface, regardless of the type of terrain (rugged, barren, or heavy foliage).

It is still a further feature to provide such a frequency-agile radar system that is small, lightweight, and compact, and that operates at low power, thereby making the system easily transportable.

It is a further feature of the invention to provide a frequency-agile radar system and method that is reliable in its detection and discrimination operations, being able to reliably detect specified targets and distinguish such from similar-sized and shaped objects.

It is another feature of the invention to provide a frequency-agile radar system and method that electronically scans a given target area, thereby assuring a complete electronic sweep of the area, which sweep assures the detection of any specified objects that may be within the swept area.

It is yet an additional feature of the invention, in accordance with one embodiment thereof, to provide such a frequency-agile radar system and method that generates and displays a two-dimensional map and/or a video image of the area being examined by the radar system.

BRIEF DESCRIPTION OF THE DRAWINGS

The above and other aspects, features and advantages of the present invention will be more apparent from the following more particular description thereof, presented in conjunction with the following drawings wherein:

FIGS. 6a and 6b are graphical representations of the cycle timing and the transmit and receive switch timing of the frequency-agile radar system;

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Advantageously, any object that reflects and/or returns signals from within an illuminated target area may be successfully detected and identified using the radar system of the present invention. Thus, for example, the invention may be used to detect and locate underground land mines. However, while the preferred embodiment of the invention relates primarily to a system used to detect buried land mines, it is to be understood that the invention is not so limited, as numerous other types of buried or surface objects may also be detected using the invention, such as underground pipes, leaks in underground pipes and storage tanks, electrical lines, treasure, underground tunnels, etc.

Figure 1:
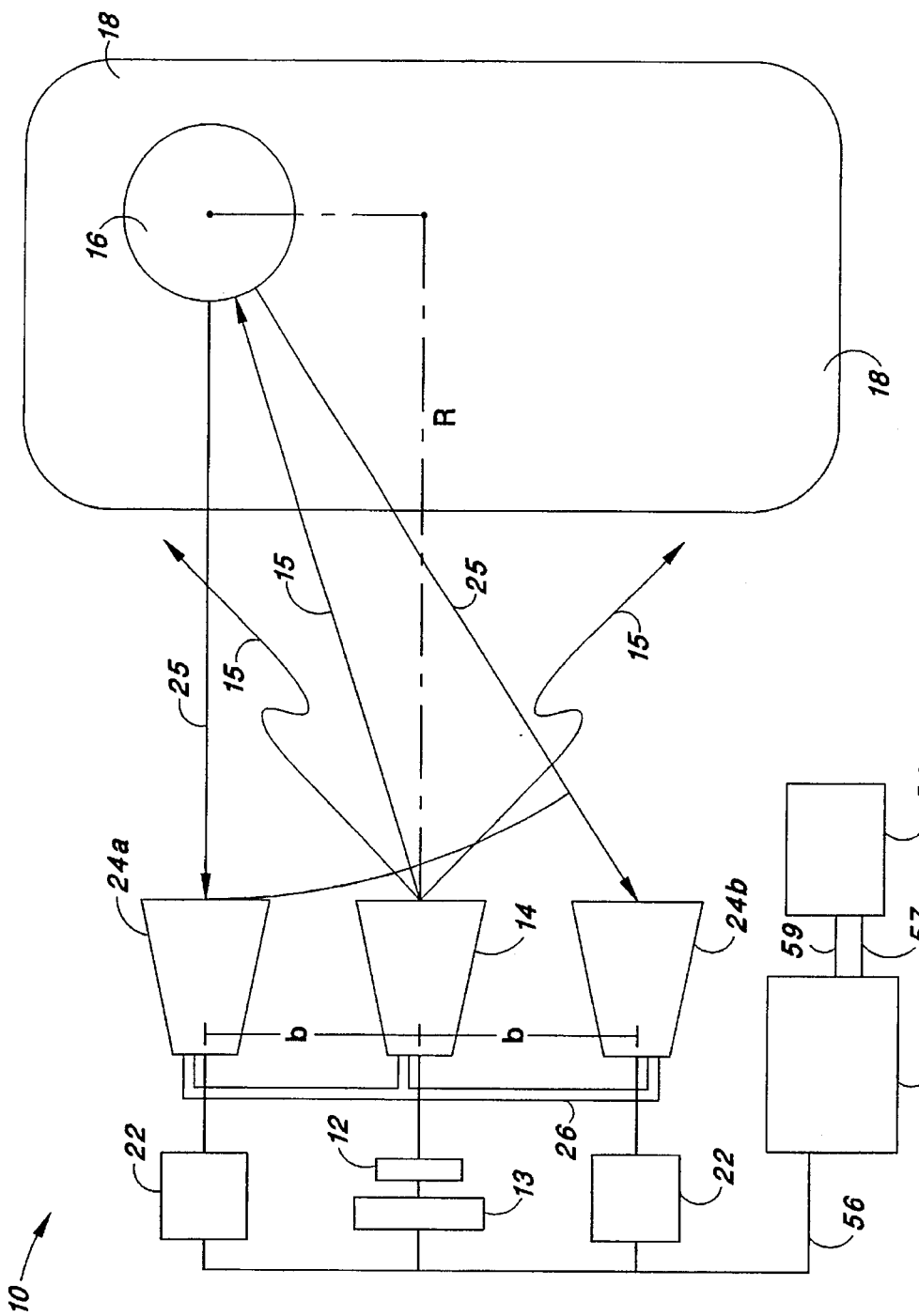
FIG. 1 shows the top plan view of a three-antenna embodiment of the frequency-agile radar system of the present invention.

Referring first to FIG. 1, a diagrammatic view of a three-antenna embodiment of a frequency-agile radar system 10 made in accordance with the present invention is illustrated. The system 10 includes a transmitter circuit 12 that includes a microwave source 13 coupled to an appropriate transmitting antenna 14 located at a probing location a distance r from a buried mine 16. The buried mine 16 is located within a target area 18. The microwave source 13 generates a burst of incident microwave power pulses in accordance with a prescribed waveform signature, e.g., at a prescribed frequency, amplitude, modulation, burst repetition rate, number of pulses within each burst, pulse separation within a burst, and the like. Such incident microwave power is represented symbolically in FIG. 1 as the arrow 15. The frequency of the incident microwave power 15 may vary, as dictated by the prescribed waveform signature, from pulse to pulse, or from burst to burst, thereby effectively sweeping the frequency of the incident power over a prescribed frequency range.

The frequency-agile radar system 10, in accordance with a preferred embodiment, irradiates the targets at 36 frequencies, from 0.5 GHz to 4 GHz, in 100 MHz steps, with a power output of nearly 1 watt. This covers the primary and secondary resonances of land mines from 1 foot in diameter to mines approximately 3" in diameter. The signal consists of a train of 10 nanosecond (ns) pulses separated by 240 ns, thereby providing a total period of 250 ns, or a repetition rate of 4 MHz with a 4% duty cycle, at each frequency. The number of pulses in the pulse train can vary, although 32 pulses is a preferred number at present. After a train of pulses have been transmitted, the system steps to the next frequency and repeats the pulse train until all 36 frequencies have been transmitted.

The incident microwave power 15 is directed by the antenna 14 towards a target area 18. The target area 18 includes one or more buried land mines 16. It is noted that the microwave source 13 may include appropriate harmonic cancellation circuits, as is known in the art, for the purpose of removing or minimizing harmonic signals that might otherwise be present in the incident microwave power signal 15.

The incident microwave power 15 interacts with whatever objects may be present in the target area 18, resulting in return signals, represented symbolically in FIG. 1 as the arrow 25. The return signals 25 will typically comprise portions of the incident microwave power 15 that are reflected from a specific object, such as the mine 16, within the target area 18. In some instances, the return signals 25 may also include signals that are generated by a specific object in response to being irradiated by the incident power signal 15, e.g., harmonics of the incident microwave power signal, or sidebands of an operating signal used within an electronic object, such as an electronic land mine 16, generated as a result of back door entry of the incident microwave power into such electronic object.

The return signals 25 are received at two spaced-apart receiving antennas 24a and 24b. The two receiving antennas 24a and 24b are mounted to suitable support structure 26 that maintains a desired separation between the two receiving antennas and the transmitting antenna 14. For most applications, the same support structure 26 used to support the receiving antennas 24a and 24b may also be used to support the transmitting antenna 14.

Appropriate receiving circuitry 22, described more fully below, separates the received signals into two channels, designated channels I and Q. The signals present in the two channels, designated as the "I channel signal" and the "Q channel signal," respectively, are then further processed by an appropriately programmed processor (not shown in FIG. 1). Such processing, as also explained more fully below, allows a determination as to whether such signals indicate the presence of any objects within the target area 18, and if so, what type of object may be present.

As depicted in FIG. 1, the structure 26 supporting the spaced-apart receiving antennas 24a and 24b, and the transmit antenna 14, is located a distance r from the target area 18. Advantageously, the distance r is selected to be a sufficiently safe stand-off distance, e.g., 2 to 30 meters, so as to prevent the mine 16 from being detonated by the system 10. Further, as explained more fully below, the radar system 10 not only detects the presence of the buried mine 16 within the target area 18, but it also identifies the type and location of the mine 16, as well as any other detected objects, within the target area 18. Hence, through use of the frequency-agile radar system 10, it is possible to map the target area 18 from a safe stand-off distance, defining the location of specific types of objects within the irradiated area.

Figure 2:
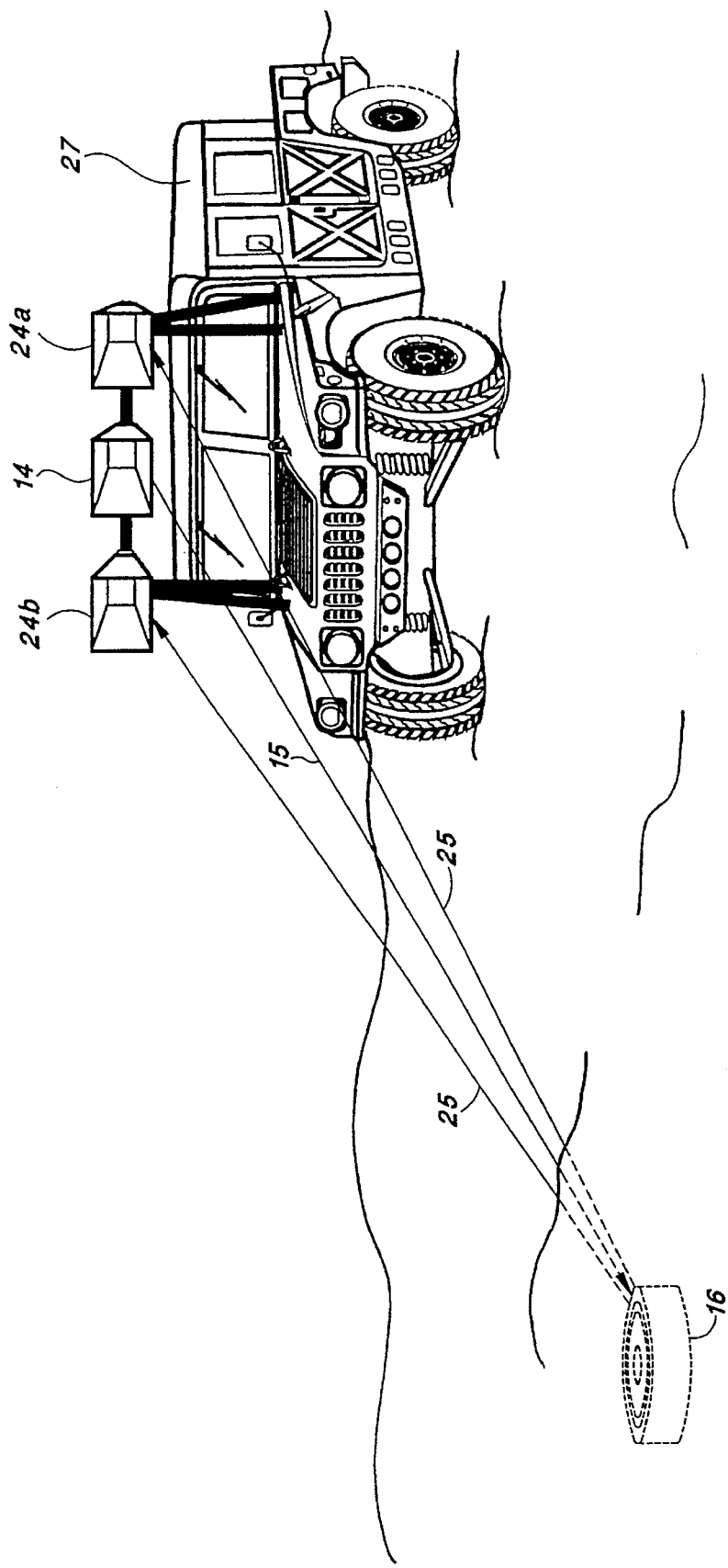
FIG. 2 depicts an embodiment of a mobile frequency-agile three-antenna radar system in accordance with the present invention.

In a preferred embodiment, the radar system 12, including the structure 26 supporting the spaced-apart receiving antennas 24a and 24b, and the transmit antenna 14, are mounted as part of a mobile vehicle 27, as depicted in FIG. 2.

Figure 3:
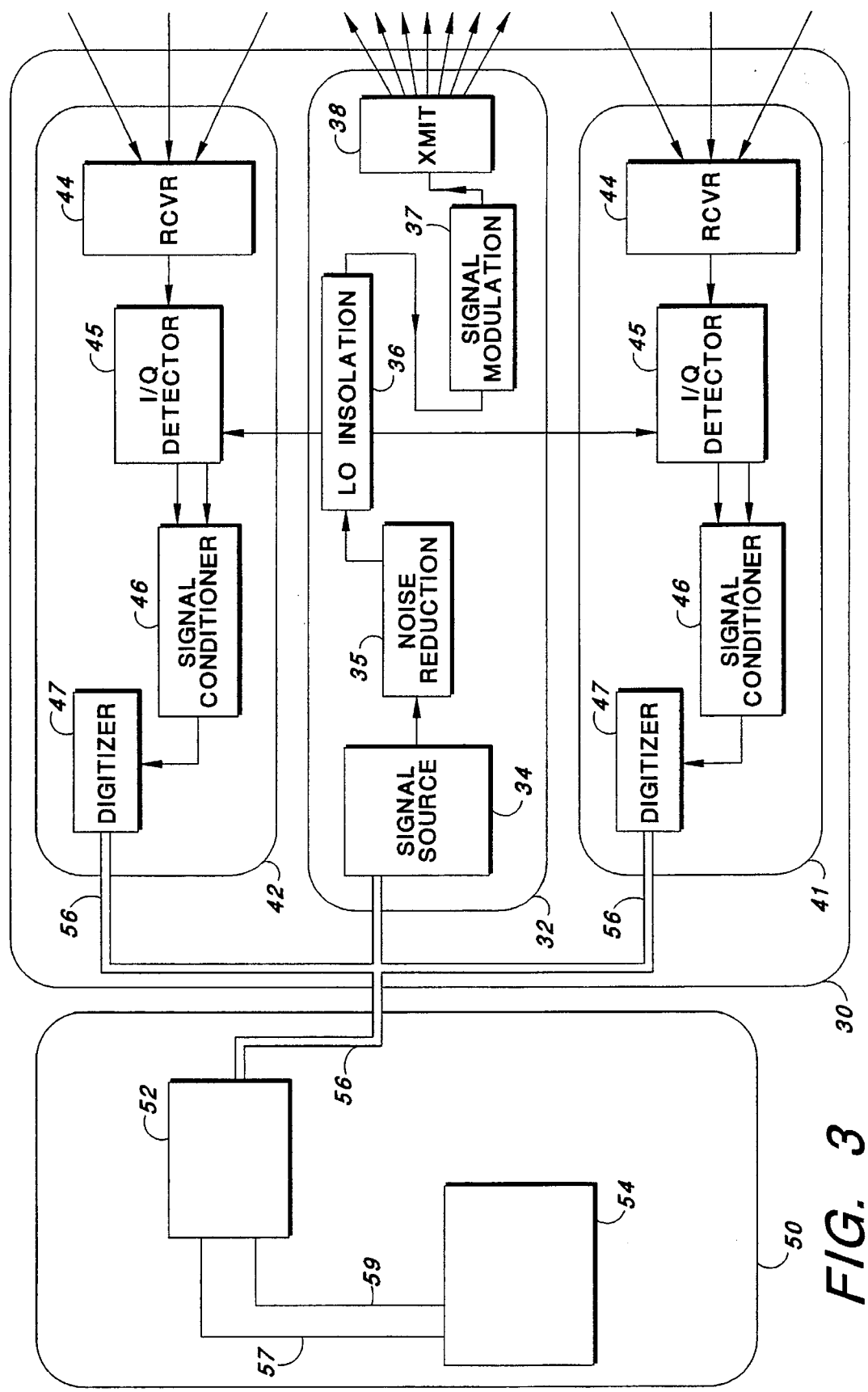
FIG. 3 is a block diagram of the main components of the frequency-agile radar system of the present invention.
Figure 4:
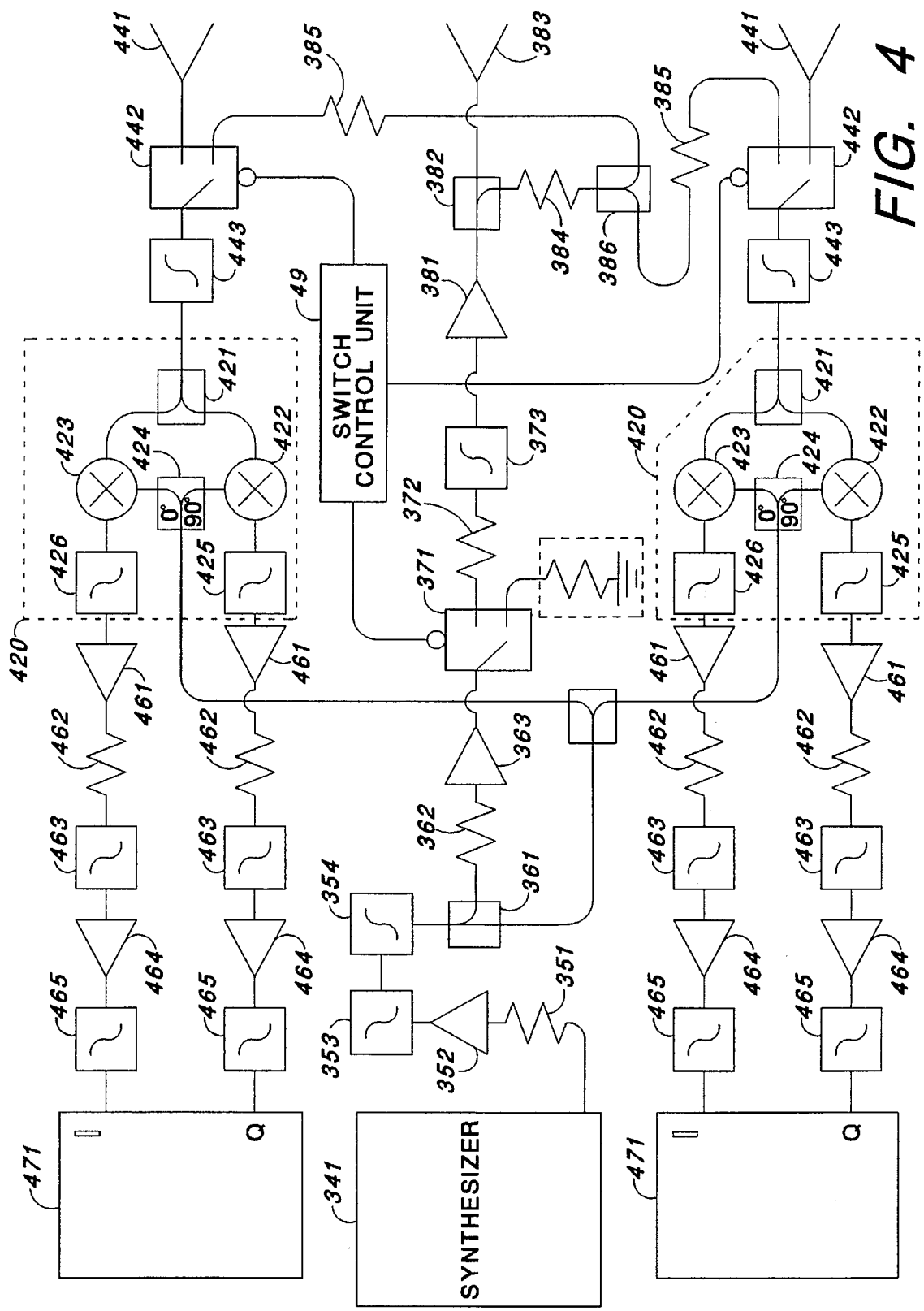
FIG. 4 is a detailed schematic of the transmit and receive stations of the present radar system.

Referring now to FIG. 3, an embodiment of the present radar system 10 consists of two major subsystems; the radar subsystem 30 and the signal processing subsystem 50. The preferred radar subsystem 30 comprises a transmit station 32 and two identical receive stations 41, 42. The transmit station 32 includes five discrete stages including: a signal source stage 34; noise reduction stage 35; local oscillator (LO) isolation stage 36; modulation stage 37; and transmission stage 38, whereas the receive stations 42 each consist of four discrete stages including: a receiving stage 44; detecting stage 45; conditioning stage 46; and digitizing stage 47. The preferred embodiment for each of these stages of the transmit and receive stations are discussed in the paragraphs that follow taken in conjunction with FIG. 4.

The signal source stage 34 of the transmit station 32 preferably includes a computer controlled frequency synthesizer 341 which serves two distinct purposes. First, the synthesizer 341 acts as the local oscillator (LO) for the receive stations 42. Second, the frequency synthesizer 341 provides the continuous wave (CW) signal 33 for the transmit station 32. The synthesizer 341 is preferably programmed to supply signals from 0.5 GHz to 4.0 GHz in 100 MHz increments.

The noise reduction stage 35 of the transmit station 32 consists of an attenuator 351, an amplifier 352, and two filters 353, 354. The attenuator 351 is a cleaning attenuator that allows the synthesizer power output to be increased which increases the signal to noise ratio (SNR) out of the synthesizer 341. The amplifier 352 amplifies the RF signal to the appropriate level for the LO drive in the receive channel mixers. The two filters 353, 354 include a low pass filter 353 and a high pass filter 354 which filters out spurious noise outside of the system bandwidth which reduces the noise floor of the radar subsystem 30.

The LO isolation stage 36 consists of a directional coupler 361, an attenuator 362, and an amplifier 363. This stage isolates the LO input to the receive stations 41, 42 from the noise generated by the modulation stage 37 of the transmit station 32. The noise generated by the modulation stage 37 can travel backwards through the radar subsystem 30 and greatly increase the noise floor in the receive stations 41, 42 if the noise is not properly blocked. Specifically, the directional coupler 361 divides the power between the transmit station 32 and receive stations 41, 42 while providing 35 dB of isolation between the transmit station 32 and receive stations 41, 42. The attenuator 362 reduces the signal to a level that the isolation amplifier 363 can handle without saturating the amplifier while the isolation amplifier 363 provides about 50 dB of isolation between the modulation stage 37 of the transmit station 32 and the receive stations 41, 42.

The modulation stage 37 consists of a high speed transmit switch 371, a level adjusting attenuator 372, and a switch noise filter 373. When the transmit switch 371 is in the "on" position, this stage generates or creates the 10 ns radar pulses to be transmitted. When the high speed transmit switch 371 is in the "off" position, the signal is terminated. The attenuator 372 and filter 373 reduce the low frequency noise generated by the high speed transmit switch 371.

The transmission stage 38 preferably consists of a 0.7 watt transmit amplifier 381, a sampling directional coupler 382, a transmit antenna 383, two attenuators 384, 385, and a power splitter 386. This stage amplifies and transmits the 10 ns pulses generated by the modulation stage 37. Most of the signal 15 is radiated out into the field towards the targets while a small portion or sampling of the signal is directly injected into the receive stations 41, 42 for use as a calibration reference. The sampled transmit signal is first attenuated to an appropriate level and then passed through a power divider 386 that is adapted to split the sampled portion of the transmit signal between the two receive stations 41, 42. The sampled transmit signal is again attenuated to provide better isolation between the two receive stations 41, 42. The transmission stage 38 also is adapted to split the LO drive power and forward the divided LO signal to the two receive stations 41, 42.

As indicated above, the preferred embodiment of the radar subsystem 30 includes two identical receive stations 41, 42, each of which includes a receiving stage 44, a detecting stage 45, a conditioning stage 46, and a digitizing stage 47. The following discussion describes the first of two identical receive stations in the preferred embodiment and it is to be understood that the other receive station is structurally and functionally identical to the first receive station. The receiving stage 44 of the receiving station 42 preferably includes an antenna 441, a high speed switch 442, and a filter 443. The antenna 441 is adapted to receive the signals 25 reflected by the targets when the high speed switch 442 is "on". When the high speed switch 442 is in the "off" position, the receiving stage 44 is accepting the calibration reference signals generated by the transmit station 32. Thus the high speed switch 442 alternates between the calibration reference signal while the 10 ns pulse 15 is being radiated towards the targets, then it switches over and receives the signal 25 reflected by the targets for most of the interval between each pulse. The receiving filter 443 is included in order to block the out of band noise generated by the high speed switch 441.

Both of the high speed receiving switches 441 together with the high speed transmit switch 371, described above, are controlled by a switch control unit 49 that controls and synchronizes the switching functions.

The detecting stage 45 of the receive station 42 uses an In phase and Quadrature phase (I/Q) detector 420 which includes a power splitter 421, two mixers 422, 423, a 90° hybrid power splitter 424, and two filters 425, 426. The two signals that this I/Q detector 420 generates are offset by 90° from one another and give the information required to calculate the phase and amplitude of the signal 25 reflected from the targets. The power splitter 421 divides the received power in the receive stage 42 between the In-phase channel and the Quadrature-phase channel. An In-phase mixer 422 and a Quadrature-phase mixer 423 convert the divided signals from the RF band to the IF band (0.5–4.0 GHz frequency range to the 1.0–100.0 MHz frequency range.) In addition, a 90° hybrid power splitter 424, divides the LO drive power in each receive channel (In-phase and Quadrature channels) and changes the phase by 90° for each channel. Filter 425, 426 are connected to each mixer 422, 423 in order to remove any unwanted signals that leak through the mixers 422, 423 above 100 MHz.

The conditioning stage 46 of the receiving station 42 preferably include two amplifiers 461, 464, an attenuator 462, and two filters 463, 465 for each channel. A first amplifier 461 is a very low noise amplifier (NF=1.2 dB). This amplifier 461 sets the theoretical dynamic range of the radar subsystem 30. The noise floor of the amplifier 461 is approximately −98 dBm at the input, which sets the low end of the dynamic range to about −90 dBm at the input to the amplifier 461. The maximum output of the amplifier 461 is 8 dBm, with the 33 dB of gain it sets the upper end of the dynamic range to about −25 dBm at the input to the amplifier. So the overall dynamic range of the radar should be approximately 65 dB. Each signal is then passed through an attenuator 462 that picks out a "window" of the total dynamic range to look at and a filter 463 which keeps the channel bandwidth at 100 MHz. The signal is then coupled to a second amplifier 464 which increases the expected maximum received signal level to +20 dBm for maximum deflection on the digitizer and is then filtered again to keep the channel bandwidth at 100 MHz. It is important to use appropriate filters 463, 465 after each amplifier 461, 464 when low level signals are being amplified because the amplifiers 461, 464 typically generate out of band noise.

The digitizing stage 47 consist of a high speed dual channel digitizer 471. The digitizing stage 47 turns the analog signals on the In-phase and Quadrature channels for the receive station 42 into digital data and sends the digital data to the signal processing subsystem 50.

It should be noted that while FIGS. 1 through 4 show the use of one transmitting antenna 14 that is equidistant from respective receiving antennas 24a and 24b, higher background noise rejection can be achieved by using an alternative configuration that has two transmitting antennas and two receiving antennas. In such alternative configuration, e.g., the same two antennas 24a and 24b used for receive may be the same two antennas as are used for transmit.

Referring again to FIG. 3, the signal processing subsystem 50 preferably includes a radar subsystem control computer 52, a signal processing unit 54, a GPIB bus 56 which provides control signals and data transfer, and communication paths between the radar subsystem control computer 52 and the signal processing unit 54. The radar subsystem control computer 52 is adapted to control the radar instrumentation and acquire the data, while the signal processing unit 54 is adapted to process and reduce the data. The radar subsystem control computer 52 and the signal processing unit 54 are preferably adapted to operate simultaneously, and communicate over both an RS232 serial port 57 and an ethernet connection 59. The primary function of the radar subsystem control computer 52 is to initiate the entire radar system 10 and subsequently control the GPIB bus 56 connected to the synthesizer 341, digitizer 471, and switch control unit 49 of the radar subsystem 30.

It is noted that the components of the radar subsystem 30 described above in connection with FIG. 4 may be realized using any of numerous commercially-available components known to those of skill in the art. A representative, but non-limiting, list of such components is presented below in Table 1.

TABLE 1

Radar Subsystem Component List

| Ref. # (FIG. 4) | Qty | Manufacturer | Model No. | Description |
|---|---|---|---|---|
| 341 | 1 | HP | 83620 | 0.01–26.5 GHz Frequency Synthesizer |
| 351 | 1 | M/A Com | 2082-6194-20 | 20 dB Attenuator |
| 352 | 1 | Mini Circuits | ZHL-1042J | 0.01–4.2 GHz Amplifier (27 dB Gain, 20 dBm max. output) |
| 353 | 1 | Lark | LSM2000-6AB | 4.0 GHz LP Filter |
| 354 | 1 | Lark | HMC500-6AB | 0.5 GHz HP Filter |
| 361 | 1 | MCLI | CB28-20 | 0.4–5.0 GHz Directional Coupler, 20 dB Coupling, >15 dB Directivity |
| 362 | 1 | M/A Com | 2082-6193-10, 2082-6191-03 | 13 dB Attenuation (10 and 3 dB Attenuators) |
| 363 | 1 | Mini Circuits | ZHL-1042J | 0.01–4.2 GHz Amplifier (27 dB Gain, 20 dBm max output) |
| 371 | 1 | American Microwave | SWM-DC20-2D, Opt: 038-A11 | 0.02–8.0 GHz GaAs Switch, Transmit, 1 dB Insertion Loss, 50 dB Isolation <2 ns rise and fall time, <10 ns delay |
| 372 | 1 | M/A Com | 2082-6193-10 | 10 dB Attenuator |
| 373 | 1 | Lark | HMC400-6AB | 0.4 GHz HP Filter |
| 381 | 1 | Mini Circuits | ZHL-42W | 0.01–4.2 GHz Amplifier (30 dB Gain, 28 dBm max. output) |
| 382 | 1 | MCLI | CB28-20 | 0.4–5.0 GHz Directional Coupler (20 dB Coupling, >15 dB Directivity |
| 383 | 1 | AEL | H-1734 | 0.5–6.0 GHz Ridged Horn |

TABLE 1-continued

Radar Subsystem Component List

| Ref. # (FIG. 4) | Qty | Manufacturer | Model No. | Description |
|---|---|---|---|---|
| 387 | 1 | MCLI | PS2-46 | Antenna 0.45–5.0 GHz Power Divider (2° Phase Match) |
| 388 | 1 | M/A Com | 2001-6101-00 | 50 Ω Termination |
| 384 | 1 | M/A Com | 2082-6194-20 | 20 dB Attenuator |
| 386 | 1 | MCLI | PS2-46 | 0.45–5.0 GHz Power Divider (2° Phase Match) |
| 471 | 2 | HP | 54510A | 1 GS/s, 2 Channel, Digitizing Oscilloscope |
| 465 | 4 | Mini Circuits | SLP-100 | 100 MHz LP Filter |
| 464 | 4 | Miteq | AUP-1224 | 1.0–500 MHz Amplifier (43 dB Gain, 20 dBm max. output) |
| 463 | 4 | Mini Circuits | SLP-100 | 100 MHz LP Filter |
| 462 | 4 | M/A Com | 2082-6194-20 | 20 dB Attenuator |
| 461 | 4 | Miteq | AU-2A-0150 | 1.0–500 MHz Amplifier (43 dB Gain, 20 dBm max. output) |
| 426 | 4 | Lark | LHP100-6AB | 100 MHz LP Filter |
| 423 | 4 | Mini Circuits | ZEM-4300 | 0.3–4.2 GHz Mixer (DC-1000 MHZ IF) |
| 424 | 2 | MCLI | HB-21/NF | 0.4–4.0 GHz 90° Hybrid Power Divider (4° Phase Match) |
| 421 | 4 | MCLI | PS2-46 | 0.45–5.0 GHz Power Divider (2° Phase Match) |
| 443 | 2 | Lark | HMC400-6AB | 0.4 GHz HP Filter |
| 442 | 2 | American Microwave | SWM-DC20-2D, Opt: 038, A11 | 0.02–8.0 GHz GaAs Switch, receive, 1 dB Insertion Loss, 50 dB Isolation <2 ns rise and fall time, <10 ns delay |
| 441 | 2 | AEL | H-1734 | 0.5–6.0 GHz Ridged Horn Antenna |
| 385 | 2 | M/A Com | 2082-6195-30 | 30 dB Attenuator |
| 49 | 1 | Jaycor | CJ-MDET-03 | Transmit and Receive Switch Driver/Timer |

Figure 5:
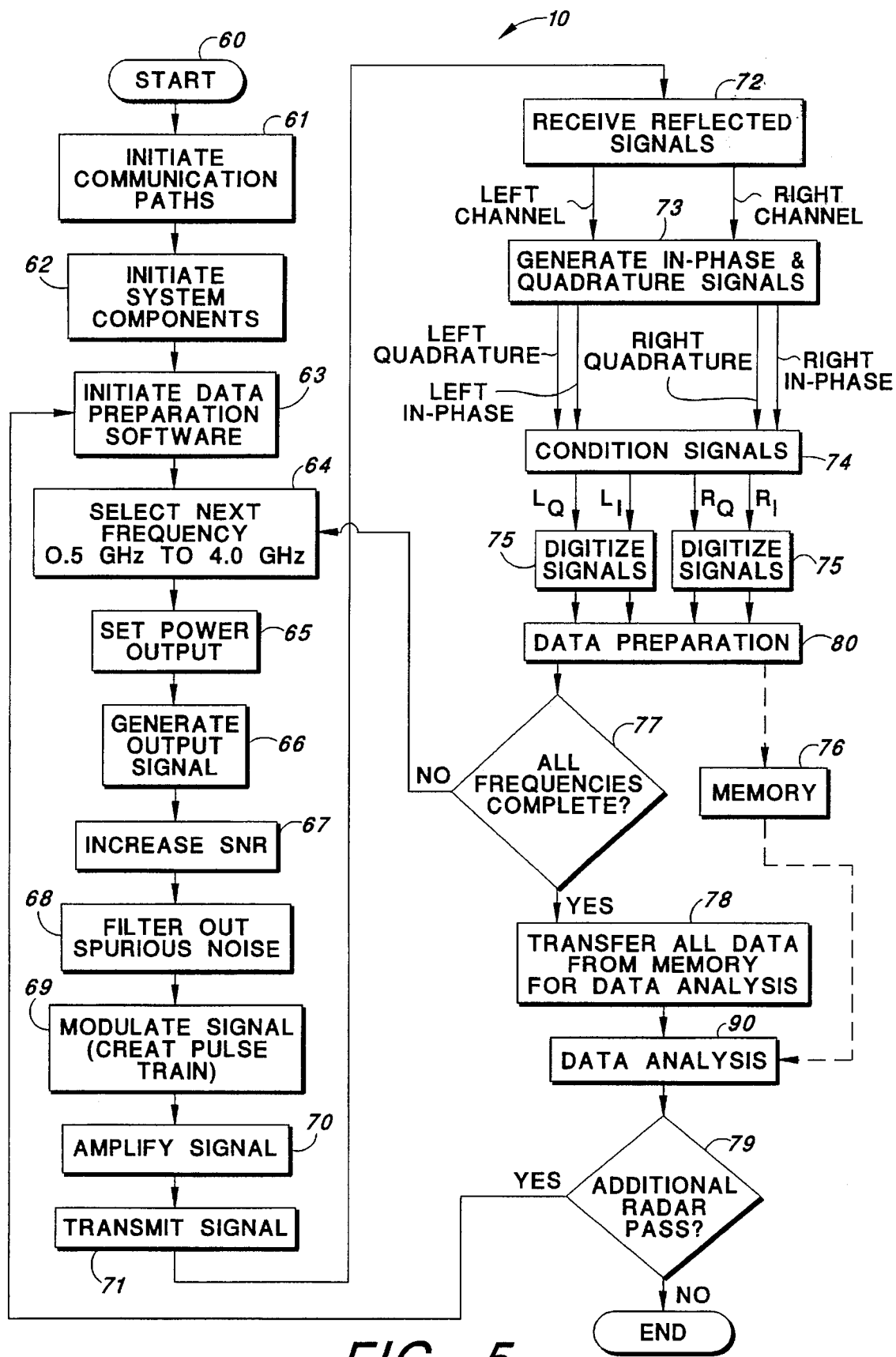
FIG. 5 is a high-level flow chart representative of the method for detecting and discriminating targets in accordance with the present invention.

Turning now to FIG. 5, the operation of the present radar system will be explained in terms of a flow diagram. Each main step or element of the operation is represented by a "block" or "box", each of which has a reference numeral associated therewith. The operation begins, block 60, with an initiating phase. In operation, the radar subsystem control computer first initiates the communication paths within the system, block 61, and then proceeds to initiate the system components and instruments, block 62, ensuring that all components of the radar system are present and responding. The last step within the initiation phase is for the radar subsystem control computer to initiate the data preparation software routines, block 63.

The radar subsystem control computer then proceeds to step through each of the 36 frequencies between 0.5 Ghz to 4.0 GHz in 100 MHz steps, block 64, setting the frequency and output power of the synthesizer, block 65 and initiating the pulse train, block 66. As each step is initiated, the outgoing signal is further processed to reduce the noise within the signal. Specifically, the signal to noise ratio of the signal out of the synthesizer is increased, block 67 and spurious noise outside of the system bandwidth is filtered out, block 68, which collectively reduces the noise floor of the radar subsystem. The outgoing signal is then modulated, block 69, to create the 32 radar pulses to be transmitted.

The radar pulses are then amplified, block 70, and transmitted, block 71, to the target area. Each radar pulse preferably lasts 10 ns with 240 ns between pulses (See FIGS. 6a and 6b). The transmitted frequencies are used to resonate all metallic and dielectric objects within the target area. Between each pulse, the echoes or reflected signals are received by the two receiving antennas, block 72. These echoes are the signatures of the objects within the target area including the soil, roots, rocks, debris, as well as the desired targets.

The reflected or incoming signals are then processed by In phase and Quadrature phase (I/Q) detector, block 73, which generates an In-phase and Quadrature signals that are offset by 90° from one another and give the information required to calculate the phase and amplitude of the signal 25 reflected from the targets 16. The four signals (In-phase and Quadrature signals for both antennas) are further conditioned, block 74, and then digitized, block 75, and stored, block 76, prior to preparing and analyzing the data. As required, The radar system then proceeds to the next stepped frequency, block 77.

After data acquisition is complete, the radar subsystem control computer uploads the data from the digitizer over the GPIB bus, and then transfers the data to the signal processing unit, block 78, via the ethernet connection. As soon as the data transfer is complete, the radar subsystem control computer informs the signal processing unit over the RS232 connection of the name and location of the data file for subsequent data preparation, block 80, and data analysis, block 90, by the signal processing unit.

The signal processing unit is used for both data preparation and final data analysis. The data preparation is accomplished in tandem with the radar subsystem control computer, with the data from one frequency being processed while the radar subsystem control computer is acquiring data for the next frequency. When all 36 frequencies are acquired, the signal processing unit uses the processed data to produce the final data analysis. The entire data acquisition process for all 36 frequencies can be repeated if desired, block 79.

Figures 7, 9:
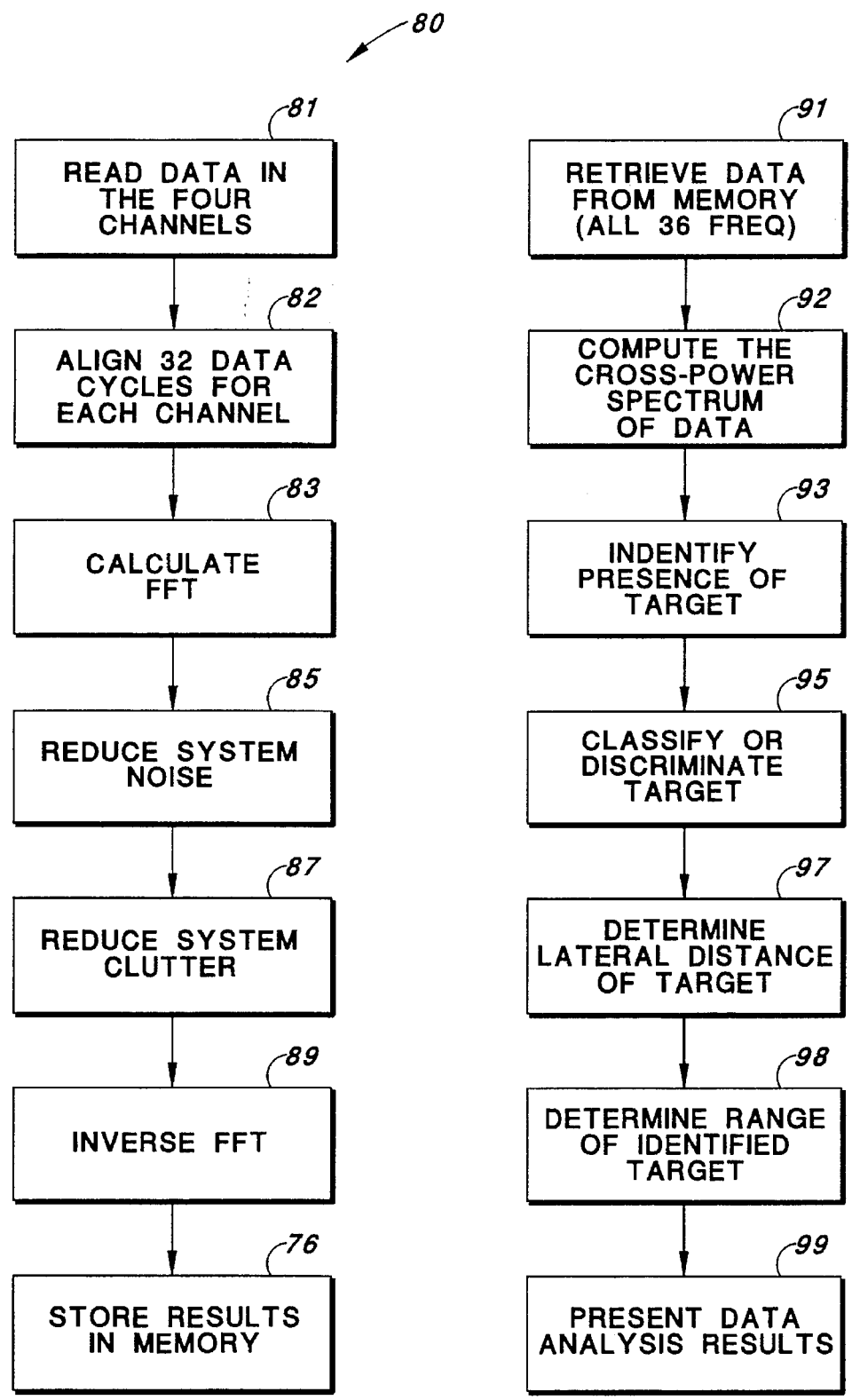
FIG. 7 is a flow chart of signal processing techniques for the data preparation phase of the signal processing subsystem.
FIG. 9 is a flow chart of signal processing techniques for data analysis phase of the signal processing subsystem.

The data preparation process 80 is generally represented in the flow diagram of FIG. 7. Such process comprises the steps of (a) reading the data for each of the four channels, block 81; (b) aligning the plurality of cycles received at each frequency, block 82; (c) calculating the Fast Fourier Transform (FFT) of the data at each frequency, block 83; (d) reducing system noise, block 85;, (e) reducing system clutter, block 87; (f) obtaining the Fourier component of the echoes by Inverse FFT (IFFT), block 89, and (g) storing the results in memory, block 76.

At each selected frequency, a plurality of radar pulses are transmitted to the target area. As indicated above, each radar pulse lasts 10 ns with 240 ns between pulses. In the preferred embodiment, there are 32 cycles each lasting approximately 250 ns. Appropriate receiving circuitry generates an In-phase signal and Quadrature signal for each of the two receiving stations, yielding a total of four channels.

The preferred system transmits 32 pulses with a cycle time of 250 ns per pulse. The four channels are each sampled at one sample per ns yielding a total of 8000 data points for each channel. The first step in the data preparation process is to shift or align the corresponding data of all 32 cycles to obtain exact 250 ns cycles. The alignment compensates for any drift that may have occurred due to the in-spec error of the equipment. The next step is to compute the FFT (Fast Fourier Transform) of the 8000 data points for each channel which creates a record of 4001 complex values. To reduce the noise caused by the system, at each frequency, the 250 ns cycles in the complex frequency domain (FFT of the 250 ns cycles) are averaged according to the following equation:

$$\bar{X}(t) = \frac{1}{32} \sum_{k=0}^{31} X(t+250k) \quad (1)$$

where t=1, 2, 3 . . . 249 and 250.

Figure 8:
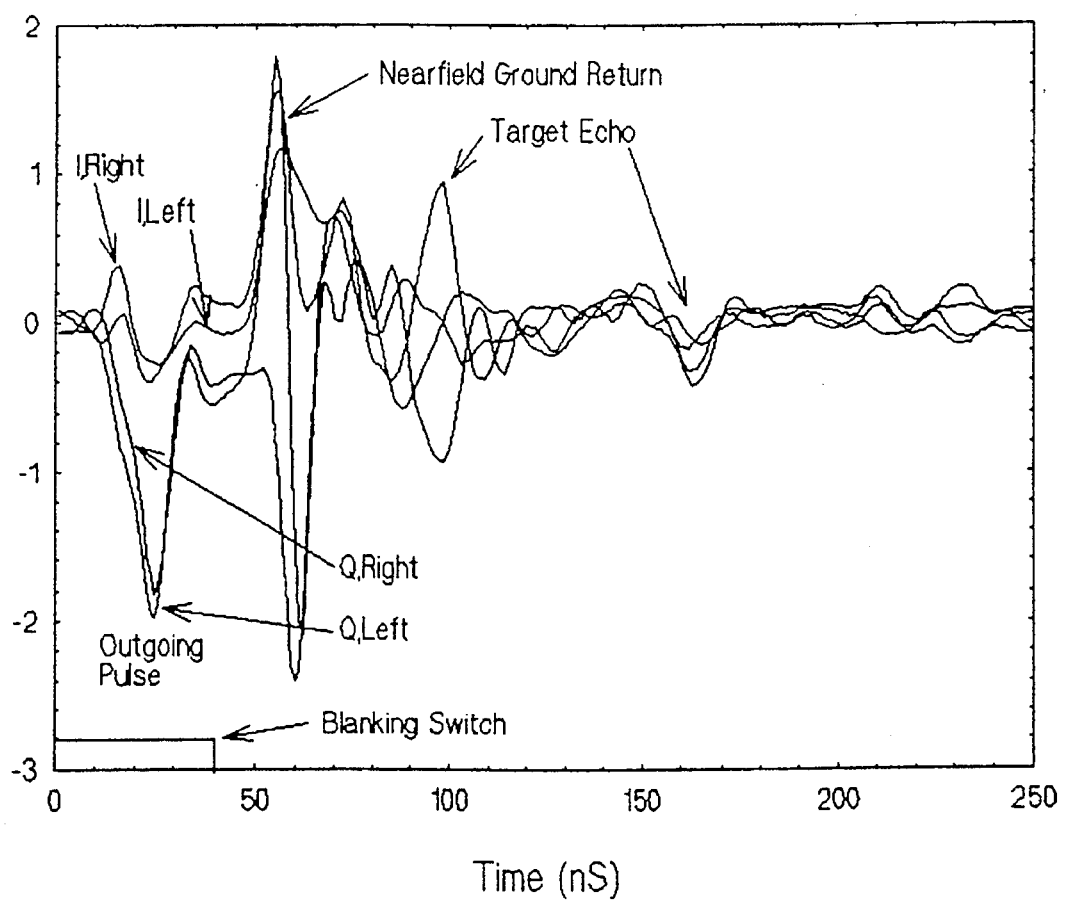
FIG. 8 is a graphical representation of typical 250 ns smoothed, averaged cycle at a given frequency illustrating both the In-phase and Quadrature channels for both receiving antennas.

Thus, the averaging is accomplished by keeping every 32nd complex value of the FFT transformed data to yield a complex array of 126 values representing the Fourier Transform of the average of the 32 cycles. The next step is to reduce the effect of clutter, the resulting data from equation (1) is smoothed with a 5-point moving average according to the following equation:

$$\bar{\bar{X}}(t) = \frac{1}{5} \sum_{k=-2}^{2} W_t \bar{X}(t,k) \quad (2)$$

where $W_t=1$ for t=1, 2, 3 . . . 249 and 250 and $W_t=0$ for all other values of t. Again the averaging is accomplished by weighting in the frequency domain to produce a 126 point data array representing the Fourier Transform of the smoothed, averaged cycle. This 126 data point array is then subjected to an Inverse FFT (IFFT) function to yield a 250 point smoothed averaged cycle for the four channels at each stepped frequency (frequency domain data). The data represents the time dependent cosine and sine components of the Fourier Transform for the reflected signals, an example of which is graphically represented in FIG. 8.

The data analysis process 90 is generally represented in the flow diagram of FIG. 9. Such process frequencies stored in the memory, block 91; (b) computing the cross-power spectrum between the "right" and "left" channels, block 92; (c) identifying the presence of a target within the target area, block 93; (d) classifying or discriminating the identified target, block 95; (e) determining the lateral location or lateral distance of the identified target, block 97; (f) determining the range of the identified target, block 98; and (g) presenting or graphically displaying data analysis results, block 99.

The cross-power spectrum between the "right" and "left" channels of the present radar system is used in the algorithms used to determine the presence of a target within the target area as well as the location of the target. The cross-power spectrum is defined as the measure of the power distribution of the two signals with respect to the frequency and is formed from the following equations:

$$S_{LR}(f_k) = [S_L(f_k)]^*[S_R(f_k)]; \quad (3a)$$

or $$S_{LR}(f_k) = (I_L(K) + iQ_L(k))(I_R(k) - iQ_R(k)) \quad (3b)$$

where k represents the data point in the 126 point frequency domain data array (i.e. k=1, 2, . . . ,126).

The presence of a targets or anomalies is accomplished using a statistic referred to as the Mahalanobis distance. The Mahalanobis distance is defined with the equation:

$$Z^2 = (X - \mu_s)' \Sigma^{-1} (X - \mu_s) \quad (4)$$

where $Z^2$ is the Mahalanobis distance of X from the background; $\mu_s$ is a 36×1 vector where the components of the vector are the means of the natural logarithms of the power spectrum for the 36 frequencies, defined above; and $\Sigma$ is the covariance matrix for the logs of the spectrum. To determine the presence of a target, a critical value of the Mahalanobis distance, $Z_{cri}^2$, having a predetermined false alarm rate is determined. When $Z^2 > Z_{cri}^2$ a target is present within the target area, otherwise no detection is made. It is important to note that the false alarm rate can be predetermined to suit the application in which the present radar system is used. The false-alarm rate for detection includes not only identifying objects which are not a particular type of object, e.g., detecting an object that is not a mine, but also not detecting objects which are the particular type of object, e.g., not detecting (overlooking) a mine.

The analysis used in the discrimination or classification of a target simply uses a library of known profiles to determine which, if any, of the known profiles is closest, using Mahalanobis distance, to the observation at hand. The library of known profiles is actually a set of vectors $\mu_i$ which allows a Mahalanobis distance for each target classification with the following equation:

$$d_i^2 = (X - \mu_i)' \Sigma^{-1} (X - \mu_i) \quad (5)$$

which are then compared to the Mahalanobis distance of the detected target to predict the classification of the target.

Determining the location of the target involves determining both the lateral location or azimuthal direction of the target and the range of the target from the transmitting antenna. Determining the lateral location involves computing the cross-correlation function between the "right" and "left" channels for each echo time from 25 ns after the pulse to 250 ns. The cross-correlation function between the signals present at "right" and "left" channels is a function of both frequency and time (since the signal is a time dependent function of the frequency) and is a measure of the similarity between the signals. The cross-correlation function is obtained by IFFT of the cross-power spectrum. Based on the time of the maximum cross-correlation function between the "right" and "left" channels the time lag between the two receivers or azimuthal delay is obtained which is used to determine the azimuth angle. The azimuth angle provides an indication of the lateral distance or lateral location of the target.

The 36 frequencies, 0.5 GHz to 4.0 GHz in 100 MHz steps, have a common cycle length of 3 meters. Accordingly, the cross-correlations computed represent a 3 meter interval.

To accomplish the data processing process, the 36 frequencies are extended to 65 frequencies (from 0 to 6.4 GHz) by inserting zeros for the new data points in the frequency domain data. The enhanced cross-correlation function is obtained by IFFT the 65 frequency domain data points to obtain 128 data points, representing the 3 meter differential leg length (−1.5 m to +1.5 m). This produces a resolution of 2.34 cm in delay multiplied by the range of the target from the transmitting antenna in meters. This resolution can be improved by using common interpolation techniques. In short range applications, the lateral distance of the target can be located within approximately 10 cm if the target has a sufficient radar cross section.

Determining the range to the target requires an accurate determination of echo time. The range (R) to the target from the transmitting antenna is determined from the following equation:

$$R = \tfrac{1}{2} ct \qquad (6)$$

where c is the speed of light and t is the echo time.

To accurately determine or refine the echo time, the cross-correlation function between the direct injected signal (See FIGS. 6a and 6b) and the two channels for each echo time from about 25 ns to 250 ns is computed. To enhance the resolution, the 36 stepped frequencies are extended to 65 frequencies (from 0 to 6.4 GHz) by inserting zeros for the new data points in the frequency domain data. The cross-correlation function is then obtained by obtaining the IFFT of the 65 frequency domain data points to obtain 128 data points, representing the 3 meter band. The 10 ns pulse gives a 3 meter uncertainty about the location of the target. This produces a resolution of 2.34 cm (3 m divided by 128) provided there is a sufficient radar cross section of the target in order to obtain a good estimate of the cross correlation.

The present invention offers several significant advantages not known to exist in presently used radar detection systems. A first significant advantage of the invention relates to being able to detect and locate objects as a function of several key variables. Such key variables include, for example: object type, object orientation, soil conditions (e.g., soil type, soil conductivity, soil permittivity, soil permeability), burial depth, intervening foliage, weather, and the like.

A second significant advantage of the invention relates to the ability to discriminate or distinguish between object types. Such discrimination is made possible through the use of appropriate signal processing procedures and techniques, e.g., optimum discrimination algorithms, that determine the size, shape, and specific object type or target. (Note, that throughout this application the terms "object" and "target" are used more or less synonymously.) A specific object type or target may be identified, for example, by maintaining a library of return difference signals from known targets, and using a fast compare algorithm that quickly compares a return signal from an unknown target to the library of return signals from known targets in order to quickly identify the unknown target or object type. The signal processing techniques also consider soil type, burial depth, and soil properties when identifying the target.

A third significant advantage of the invention relates to the ability to improve its signal-to-noise ratio (SNR). Such improvement may be realized by increasing the object return signal or by decreasing the background return noise. The object return signal may be effectively increased, e.g., by spatial averaging of many data cycles. The background return noise may be decreased, e.g., by gating the transmitter and/or receiver to reject ground return signals from in front of the object being detected.

A fourth significant advantage of the invention relates to its overall size, weight, and power requirements. The components needed to make the hardware portions of the invention are not large, expensive, high-power consuming components. Hence, the invention may be readily portable, thereby allowing its use for numerous applications, such as man-portable, vehicle-mounted, or carried in an unmanned air vehicle (UAV).

The key performance parameters achievable using the present embodiment of the frequency-agile radar system are summarized in Table 2. Such performance parameters include range, resolution distance, search area beam width, and beam area. Other performance parameters of concern include false-alarm rate for detection, false-alarm rate for discrimination, and scan rate/dwell time.

TABLE 2

Performance Parameters Achievable With Present Embodiment of Frequency-Agile Radar System

| Parameter | Symbol | Nominal Parameter Range |
|---|---|---|
| Range | r | several m to several km |
| Resolution Distance | $r_0$ | The order of the object dimensions (≈10 cm) |
| Search area Beam Width | $D_{beam}$ | 5 m for 5-m range 300 m for 2-km range |
| Beam Area | $A_{beam}$ | 20 to $10^5$ m$^2$ |

The object and soil characteristics that play a key role in determining detectability and discrimination include the object size/shape radar cross section versus frequency and orientation, soil conductivity, soil permittivity, and burial depth. Representative soil and object properties suitable for use of the present embodiment of frequency-agile radar system are presented in Table 3.

TABLE 3

Representative Soil and Target Properties Suitable For Use With Present Embodiment of Radar System

| Parameter | Symbol | Nominal Parameter Range |
|---|---|---|
| Object dimensions | $d_i$ | Few to tens of cm |
| Maximum object radar cross section | $\sigma_{target}$ | Few to tens of cm$^2$ for conducting object; factor of 20 lower for dielectric object; factor of 100 lower for rocks |
| Soil Conductivity | $\sigma_{soil}$ | $10^{-2}$ to $10^{-3}$ mho/m |
| Soil Permeability (relative) | $\mu_r$ | Near unity |
| Soil Permittivity (relative) | $\epsilon_r$ | Few to several tens |
| Object burial depth | h | Few to tens of cm |
| Soil skin depth | δ | $(2/\sigma)(\epsilon/\mu)^{1/2}$ to ≈20 m |
| Two-way soil surface transmission coefficient | T | 0.5 to 0.9 |
| Effective background radar cross section per unit area | $\sigma^0$ | $10^{-3}$ to $10^{-1}$ |

The derived radar system parameters include the total radiated power, random frequency range and instantaneous bandwidth, antenna number and size (or gain), antenna spacing, and scan rates. Such parameters for a frequency-agile radar system made in accordance with the present embodiment of the invention for the application of detecting buried land mines are shown in Table 4.

TABLE 4

Derived Parameters For Present Embodiment of Frequency-Agile Radar System

| Parameter | Symbol | Nominal Parameter Range |
|---|---|---|
| Total radiated power | P | Few to tens of Watts |
| Frequency range | f | 0.5 to 5 GHz |
| Instantaneous bandwidth | $\Delta f_o$ | 100 MHz |
| Number of antennas | | 2 to 5 |
| Antenna diameter | $D_{ANT}$ | 0.3 to 1 meter |
| Antenna gain | G | 10 to 100 |
| Antenna spacing | 2b | 0.3 to 1 meter |
| Minimum detectable signal | $S_{min}$ | $10^{-13}$ to $10^{-14}$ W |

As seen from the above description, the present invention provides a frequency-agile radar system and method that allows detection and discrimination of selected individual targets from relatively short ranges (e.g., 2 to 10 meters or more), as well as the detection of clusters of such individual targets, e.g., a mine field, from relatively long ranges (kilometers).

As also seen from the above description, the present invention provides such a frequency-agile radar system and method wherein location resolution of detected targets is provided to within a fraction of a wavelength of the radar signal used (e.g., to within a few centimeters). Further, it is seen that such frequency-agile radar system and method may detect both metallic and dielectric targets, either buried or on the surface, regardless of the type of terrain (rugged, barren, or heavy foliage) wherein the target may be located.

As further seen from the above, the present invention provides such a frequency-agile radar system that is not only small, lightweight, compact, and operable at low power levels, thereby making the system easily transportable, but that is also reliable in its detection and discrimination operations. Moreover, such system is capable of electronically scanning a given target area, thereby better assuring the detection and discrimination of any objects within the swept area.

The present invention and its advantages will be understood from the foregoing description, and it will be apparent that numerous modifications and variations could be made thereto by those persons skilled in the art without departing from the spirit and scope of the invention or sacrificing all of its material advantages, the forms hereinbefore described being merely exemplary embodiments thereof.

To that end, it is not intended that the scope of the invention be limited to the specific embodiments illustrated and described. Rather, it is intended that the scope of this invention be determined by the appending claims and their equivalents.

What is claimed is:

1. A method of detecting the presence of a buried object within a target area from a probing location that is a prescribed stand-off distance away from the target area, the method comprising the steps of:

(a) irradiating the target area with a plurality of incident pulses of microwave power from the probing location, the incident pulses having a prescribed waveform signature;

(b) receiving a plurality of return pulses of microwave power reflected from the target area at two spaced-apart locations, the two spaced-apart locations having a prescribed orientation relative to the probing location; and (c) processing the return pulses received at the two spaced-apart locations in step (b) to determine the presence and location of the object.

2. The method of claim 1 wherein the step of irradiating the target area with an incident pulse of microwave power from the probing location further comprises the steps of:

(a1) producing a frequency adjustable continuous wave signal over a range of frequencies in prescribed increments;

(a2) modulating the continuous wave signal to produce short duration radar pulses to be transmitted;

(a3) transmitting the short duration radar pulses towards the target area;

(a4) adjusting the continuous wave signal frequency by the preselected increment; and (a5) repeating steps (a2) through (a4) concurrently with the step (b) and step (c) until the range of frequencies have been transmitted.

3. The method of claim 1 wherein the step of receiving the plurality of return pulses of microwave power reflected from the target area at two spaced-apart locations further comprises the steps of:

(b1) receiving the plurality of return pulses reflected from the target area;

(b2) detecting In-phase and Quadrature signals within each return pulse at each of the two spaced-apart locations;

(b3) conditioning the In-phase and Quadrature signals for each returned pulse;

(b4) digitizing the conditioned In-phase and Quadrature signals for each return pulse; and (b5) reducing system noise and clutter present in the digitized signals to produce output signals.

4. The method of claim 1 wherein the step of processing the plurality of return pulses received at the two spaced-apart locations to determine the presence and location of the object further comprises the steps of:

(c1) computing a power spectrum and a cross-correlation of the plurality of return pulses;

(c2) computing a decision statistic based on the power spectrum of the return pulses over a range of frequencies near a resonant frequency of the object to ascertain whether the particular object is present within the target area; and (c3) determining a range and an azimuth angle of the particular object present within the target area to ascertain the location of the detected object.

5. The method of claim 4 further comprising the steps of:

(c4) identifying a particular set of attributes associated with the power spectrum of the return pulses representative of a particular target type; and (c5) comparing the particular set of attributes associated with the power spectrum of the particular object present within the target area with a library of stored identification data representative of the particular set of attributes associated with the power spectrum of prescribed objects to ascertain the type of object detected.

6. The method of claim 1 wherein the probing location is contained on a mobile vehicle.

7. A method of detecting the presence of an object within a target area from a probing location that is a prescribed stand-off distance away from the target area, the method comprising the steps of:

(a) producing a frequency adjustable continuous wave signal over a range of frequencies in prescribed increments;

(b) modulating the continuous wave signal to produce short duration radar pulses to be transmitted;

(c) transmitting the short duration radar pulses from the probing location towards the target area;

(d) receiving the plurality of return pulses reflected from the target area at two spaced-apart locations, the two spaced-apart locations having a prescribed orientation relative to the probing location;

(e) detecting In-phase and Quadrature signals within each return pulse at each of the two spaced-apart locations;

(f) conditioning the In-phase and Quadrature signals for each returned pulse;

(g) digitizing the conditioned In-phase and Quadrature signals for each return pulse;

(h) reducing system noise and clutter present in the digitized signals to produce output signals;

(i) adjusting the continuous wave signal frequency by the preselected increment;

(j) processing the output signals to determine the presence and location of the object; and (k) repeating steps (b) through (j) until the range of frequencies have been transmitted.

8. The method of claim 7 wherein the step of processing the output signals to determine the presence and location of the object further comprises the steps of:

(l) computing a power spectrum and a cross-correlation of the output signals;

(m) computing a decision statistic based on the power spectrum of the output signals over the range of frequencies to ascertain whether the particular object is present within the target area; and (n) determining a range and an azimuth angle of the particular object present within the target area to ascertain the location of the detected object.

9. The method of claim 8 further comprising the steps of:

(o) identifying a particular set of attributes associated with the power spectrum of the output signals representative of a particular target type; and (p) comparing the particular set of attributes associated with the power spectrum of the particular object present within the target area with a library of stored identification data representative of the particular set of attributes associated with the power spectrum of prescribed objects to ascertain the type of object detected.

10. A radar system comprising:

frequency-agile transmitting means for transmitting an incident pulse of microwave power having an adjustable frequency;

receiving means for receiving a return pulse of the microwave power from a target area, the return pulse representing the reflection of the incident pulse of microwave power from at least one object located within the target area, the receiving means including means for receiving the return pulse at a plurality of spaced-apart locations relative to the location of the transmitting means;

first processing means for processing the return pulse received at each of the plurality of spaced-apart locations in respective processing channels, and for producing output signals based on said processing; and second processing means responsive to the output signals for indicating the presence and location of a particular type of object within the target area.

11. The radar system as set forth in claim 10 wherein the receiving means includes first and second receiving antennas spaced a prescribed distance apart, and wherein the frequency-agile transmitting means includes a transmit antenna, and further wherein the transmit antenna is positioned substantially equidistant from each of the receiving antennas.

12. The radar system as set forth in claim 11 wherein the transmit antenna and the first and second receiving antennas are mounted to the same support structure.

13. The radar system as set forth in claim 12 wherein the support structure is portable.

14. The radar system as set forth in claim 11 wherein the frequency-agile transmitting means includes first and second transmit antennas spaced a prescribed distance apart and having a fixed relationship relative to the first and second receiving antennas.

15. The radar system as set forth in claim 14 wherein the first transmit antenna and the first receiving antenna comprise the same antenna, and wherein the second transmit antenna and the second receiving antenna comprise the same antenna.

16. The radar system as set forth in claim 10 wherein the first processing means further comprises an In-phase and Quadrature detector means for detecting In-phase and Quadrature signals within the return pulse, means for conditioning the In-phase and Quadrature signals, and means for digitizing the conditioned In-phase and Quadrature signals.

17. The radar system as set forth in claim 10 wherein the second processing means further includes means for reducing system noise.

18. The radar system as set forth in claim 17 wherein the second processing means further includes means for reducing system clutter.

19. The radar system as set forth in claim 10 wherein the second processing means further includes means for computing a cross-power spectrum and a cross-correlation of the output signals.

20. The radar system as set forth in claim 19 wherein the second processing means further includes statistical means for computing a decision statistic based on the cross-power spectrum of the output signals over a range of frequencies near a resonant frequency of a particular target type, the decision statistic providing an indication as to whether the particular target type is present within the target area.

21. The radar system as set forth in claim 20 wherein the second processing means further includes identification means for identifying a particular set of attributes associated with the cross-power spectrum of the output signals representative of a particular target type.

22. The radar system as set forth in claim 21 wherein the second processing means further comprise:

storage means for storing identification values representative of the particular set of attributes associated with the cross-power spectrum of particular target types; and comparison means for comparing the particular set of attributes associated with the cross-power spectrum of the identified target with the stored identification values.

23. The radar system as set forth in claim 20 wherein the second processing means further includes location identification means for identifying a range and an azimuth angle of the particular target present within the target area.

24. Detection apparatus for detecting the presence of an object within a target area from a probing location located a prescribed stand-off distance away from the target area comprising:

irradiating means for irradiating the target area with an incident pulse of microwave power from the probing location, the pulse having a prescribed waveform signature;

receiving means for receiving a return pulse signal of microwave power reflected from the target area at two spaced-apart locations, the two spaced-apart locations having a prescribed orientation relative to the probing location;

receiving circuitry means for processing the return pulse received at each of the plurality of spaced-apart locations in respective processing channels, and for producing output signals therefrom; and processing means responsive to the output signals for statistically determining whether the return pulse signal thus received indicates the presence of an object within the target area, and if so, the location of the object.

25. The detection apparatus as set forth in claim 24 wherein the processing means further comprises means for reducing system noise and clutter in the output signals.

26. The detection apparatus as set forth in claim 25 wherein the processing means further comprises means for computing a cross-power spectrum and a cross-correlation of the output signals.

27. The detection apparatus as set forth in claim 26 wherein the processing means further includes statistical means for computing a decision statistic based on the cross-power spectrum of the output signals over a range of frequencies near a resonant frequency of a particular object, the decision statistic providing an indication as to whether the particular object is present within the target area.

28. The detection apparatus as set forth in claim 27 wherein the processing means further includes location identification means for identifying a range and an azimuth angle of the particular object present within the target area.

* * * * *